July 22, 1941.   O. S. CARLISS   2,250,294
WEIGHING AND COUNTING SCALE
Filed Sept. 3, 1938
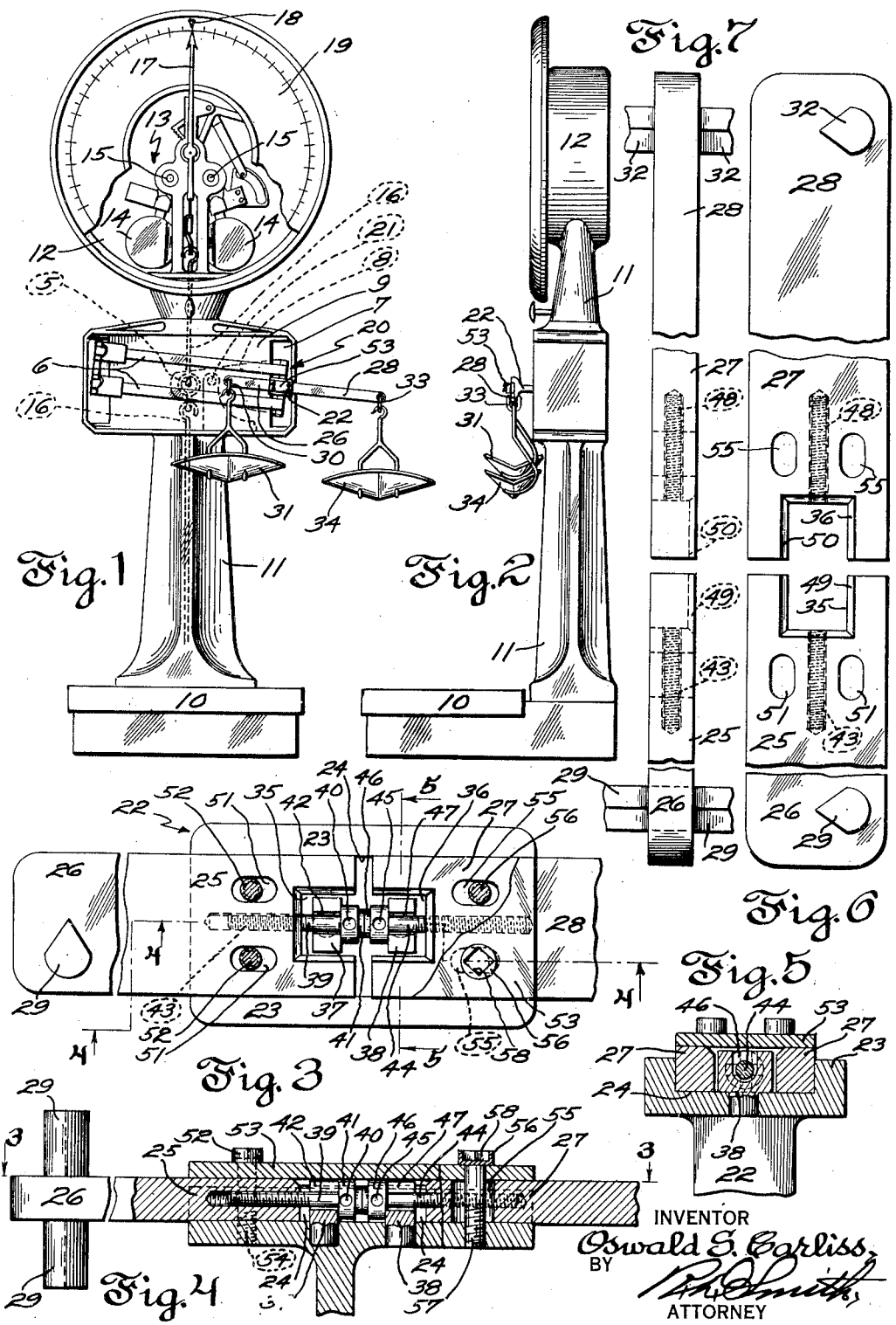
INVENTOR
Oswald S. Carliss
BY
ATTORNEY Patented July 22, 1941

2,250,294

UNITED STATES PATENT OFFICE 2,250,294

WEIGHING AND COUNTING SCALE

Oswald S. Carliss, Fairfield, Conn., assignor to The Kron Company, Bridgeport, Conn., a corporation of Connecticut Application September 3, 1938, Serial No. 228,344

14 Claims. (Cl. 265—62)

This invention relates to weighing and counting scales, particularly of the type employing automatic load counterbalancing pendulums with associated weight indicating mechanism. In such scales a pointer associated with dial graduations may, in a well known manner, be caused to swing into register with a given index on the dial when a load on the platform consisting of a large quantity of like articles is counterbalanced by a proportionately small number of specimens of such articles deposited in one or more so-called "counting pans" to attain a desired condition of balance and pointer indication. The present improvements particularly concern combinations of features which permit adjustment in the structure employed to support one or more such counting pans or equivalent containers to the end that the whole balancing system may be conditioned correctively for accurate counting by varying at will the effective moment with which the empty counting pan or combined empty pans shall act in the balancing system.

Counting scales, such as that disclosed in United States Patent No. 1,352,925, granted to J. C. Barrett, have employed a pivot-supported beam structure usable as a tare beam and connected to tilt in unison with weighing movements of the automatic load counterbalancing mechanism and carrying a counting pan suspended from such beam structure at an adjustable distance from the fulcrum thereof. Obstacles to accurate counting arise, however, when two or more such counting pans are suspended from the same beam structure in spaced relation for conjoint use in determining the count of articles in a platform supported load. The added pan is placed at less distance from the fulcrum of the beam structure in order that the weight of one specimen piece placed in that pan shall exert less leverage in the balancing system than would the same piece if placed in the usual single counting pan. For accurate counting with two pans it thus becomes greatly more important that the effective lever arms of the two counting pans are of accurate lengths and that such lengths shall be accurately proportioned to each other.

To compensate for inaccuracies of machining and assemblage of the parts as well as for disturbances of originally established dimensions, there is need for some means for effecting a fine degree of independent adjustment of the distance between the point of support of each of the two counting pans and the fulcrum of the beam structure. Likewise there is needed a corresponding means for fine independent adjustment of the distance separating the points of support of the two pans. As the corrective effect of a given such adjustment upon the balancing system is best determined by test use of the weighing apparatus while the adjustable parts are exposed for manipulation, it is important that the parts which directly support the counting pans be held with dependable rigidity against displacement in other than their designed direction of adjustive movement.

An object of this invention is to provide in weighing and counting apparatus improved means for selectively and independently varying, in a manner to suit the above described needs, the effective length of the lever arm or arms of one or more counting pans or equivalent containers for counting-pieces.

A further object is to provide means for independently and minutely adjusting the spacing of the points of support of two such pans or containers carried by the same beam structure.

A further object is to provide a simple and rugged assemblage of parts affording the abilities of adjustment referred to while providing rugged constraint restricting the parts which support the pans to adjustive movement in designated directions and preferably to adjustive movement of translational nature in longitudinally aligned paths.

Still further objects are to provide means for concealing the adjusting devices by covering and enclosing them in a manner to exclude dirt and protect them from accidental disturbance or damage.

These and other objects of the improvements will become clear from the following description of an illustrative embodiment of the invention, in which description reference is had to the accompanying drawing, wherein:

Fig. 1 is a front view of a dial head type weighing and counting scale equipped with adjustable structure for supporting the counting pans and embodying the present improvements.

Fig. 2 is a side view of the complete scale looking from the right at Fig. 1.

Fig. 3 is a greatly enlarged front view taken mostly in section on the plane 3—3 in Fig. 4 showing the adjacently mounted ends of the separate pan supporting bars, a corner portion, only, of the cover plate being shown.

Fig. 4 is a view of the assembled mounting parts taken in section on the planes 4—4 in Fig. 3 looking in the direction of the arrows.

Fig. 5 is a view taken in section on the plane

5—5 in Fig. 3 looking in the direction of the arrows.

Fig. 6 is a detail of the two adjustable bars removed from associated structures, one bar being shown as contracted in length.

Fig. 7 is a fragmentary edgewise view looking from the left at Fig. 6.

In Figs. 1 and 2 the complete scale includes a weighing platform 10, a hollow standard 11 arising at the rear thereof and supporting the casing 12 for automatic load counterbalancing and weight indicating mechanism indicated as a whole at 13. The construction and operation of this mechanism may be as shown in complete detail in United States Patent No. 2,025,817, granted to Glenn E. Weist, and includes load counterbalancing pendulums 14 which are caused to swing upwardly about pivots 15 by the downward pull exerted by the load upon a system of connector rods 16 extending vertically through the hollow standard 11 from the usual equalizing system of leverage (not shown) beneath the load receiving platform or receptacle 10 to the dial head mechanism 13. Adequate illustration and description of suitable connections between platform 10 and dial head mechanism 13 is contained in the aforesaid Patent No. 1,352,935, granted to J. C. Barrett. Through action of the mechanism 13, the indicating pointer 17 sweeps rotatively over graduations 18 on the dial face 19 for indicating the weight of loads on platform 10.

Back of display partition 9 the rod connections 16 are pivotally coupled at 5 to a beam mounting lever 8 in a manner to bear downwardly upon the latter when a load on platform 10 acts to lift pendulums 14. Lever 8 forms a part of the entire beam structure which as a whole is hereinafter designated 20 and is pivotally supported upon the frame fulcrum 21 at the rear of partition 9. This beam structure carries rigidly with it the forwardly projecting bracket arm 22 whose up and down movement is accommodated by aperture 7 in partition 9 and whose front face is channeled crosswise at 24. The poise carrying tare beams 6 also form rigid parts of the beam structure and are carried to swing in front of partition 9.

Both the right end portion 25 of a bar 26 and the left end portion 27 of a bar 28 are seated in the channel 24 with a snug sliding fit edgewise in relation thereto. Bar 26 carries the knife edged studs 29 from which, by means of the looped hook 30, is suspended the counting pan 31 while bar 28 carries the knife edged studs 32 from which, by means of the looped hook 33, is suspended the counting pan 34.

The companion inner end portions 25 and 27 of these pan supporting bars are provided with similar rectangular cutouts 35 and 36, respectively, to make room for abutments 37 and 38, respectively. The rear ends of these abutments are fixedly inserted within the metal of bracket arm 22 or rigidly attached thereto in any suitable way to occupy the channel 24 thereof. If preferred, abutments 37 and 38 may be cast integral with the metal of bracket arm 22.

A screw 39 having radially disposed wrench holes 40 opening through the periphery of its filister head 41 occupies a notch 42 in abutment stud 37 and has threaded engagement with a hole 43 in the right end portion 25 of bar 26. Similarly a screw 44 having radially disposed holes 45 in its filister head 46 occupies a notch 47 in the abutment stud 38 and has threaded engagement with a tapped hole 48 in the left end portion 27 of the bar 28. As the overall thickness of the heads 41, 46 of screws 39 and 44 exactly equals the space between adjacent sides of the abutments 37 and 38, and as the edges of cutouts 35 and 36 are chamfered at 49 and 50, respectively, to give room for a quarter turn swinging of some rod-like wrench or tool which may be inserted in the holes 40 and 45, independent turing of either screw 39 or 44 by means of such wrench or tool will correspondingly move the pan supporting bar with which it is engaged lengthwise and adjustably toward the right or toward the left depending upon the direction in which the screw is turned. See Figs. 1, 3 and 4.

The right end portion 25 of bar 26 contains elongated openings 51 through which pass the shanks of screws 52. The heads of screws 52 retain a cover plate 53 against the front surfaces of bars 26 and 28 and the shanks of screws 52 have threaded engagement at 54 with the bracket arm 22. In a similar fashion the left end portion 27 of bar 28 contains elongated openings 55 through which pass the screws 56 having threaded engagement at 57 with the bracket arm 22 and whose heads assist in holding the cover plate 53 against the front surfaces of bars 26 and 28. The head of each screw 52 or 56 may be provided with a square socket 58 to receive a special plug-type wrench, thereby to discourage meddling with these screws by persons not in possession of the special kind of wrench required to loosen or remove them.

In the operation of a scale embodying the present improvements, it may be found that either or both counting pans require their points of suspension to be moved slightly nearer to or farther away from the fulcrum 21 of the beam structure 20 in order that specimen counters placed in these pans may properly cooperate in the balancing action of mechanism 13. Adjustment of screws 39 and 44 may be resorted to for enabling a given number of specimen articles or counters placed in either or both of the counting pans 31 or 34 to bring the dial pointer 17 into exact register with a given one of the graduations 18 on the dial face 19 when a given greater number of the articles are placed upon the weighing platform 10. In making this adjustment, all of screws 52 and 56 are first removed together with the cover plate 53 thus exposing both of the screw heads 41 and 46 so that either or both of them may be turned as desired. When the desired adjustment has been made, cover plate 53 and the screws 52 and 56 are restored. Tightening these screws clamps the end portions 25 and 27 of both pan supporting bars firmly against the sunken surface of bracket arm 22 within the channel 24 so that thereafter the adjusting screws 39 and 44 alone are not depended upon to maintain the adjustment which they are used to effect. Also the cover plate 53 conceals and tends to render tamper proof the means of adjustment while protecting the same from accidental damage or accumulation of dirt.

It will be noted that mutual contacting of heads 41 and 46 of the adjusting screws avoids dependence upon accuracy of dimensions in the bracket arm 22 other than in the spacing of the two sides of abutments 37 and 38 which face each other and that this arrangement of parts brings the two adjustable screw heads into convenient proximity for cooperative adjustment. The notches 42 and 47 permit ready removal of the bars from channel 24 for servicing or replacement while the adjusting screws 39 and 44 remain assembled with their respective bars.

The particular constructions and assemblage of parts which have been described are illustrative of but one of many possible forms in which the present invention may be embodied, and the appended claims will therefore be understood to include within their scope and coverage all mechanical equivalents for the exact parts and arrangements herein disclosed.

I claim:

1. In a counting scale, the combination of, a load receptacle, mechanism constructed and connected automatically to counterbalance a load on said receptacle, a weight indicator connected to be moved by said mechanism, a fulcrum supported tare beam structure connected to impart a moment to said mechanism, a counting-piece container, and an assemblage of members supporting said container and mounted on said beam structure away from said fulcrum of the latter and constructed and arranged to permit said container when empty to be moved adjustively relative to said beam structure in a manner to vary the moment exerted by said combined structure and assemblage and container on said load counterbalancing mechanism, thereby to alter the weight registering position of said indicator without corresponding change of load on said receptacle.

2. In a counting scale, the combination of a load receptacle, mechanism constructed and connected automatically to counterbalance a load on said receptacle, a weight indicator connected to be moved by said mechanism, a fulcrum supported tare beam structure connected to impart a moment to said mechanism, at least two separate counting piece containers, and an assemblage of members supporting said containers and mounted on said beam structure at a distance from the fulcrum of the latter and constructed and arranged to permit one of said containers when empty to be moved adjustively and independently relative to said beam structure in a manner to vary the moment exerted by said combined structure assemblage and containers on said load counterbalancing mechanism, thereby to alter the weight registering position of said indicator without corresponding change of load on said receptacle.

3. In a counting scale, the combination of a load receptacle, mechanism constructed and connected automatically to counterbalance a load on said receptacle, a weight indicator connected to be moved by said mechanism, a fulcrum supported tare beam structure connected to impart a moment to said mechanism, at least two separate counting-piece containers, and an assemblage of members supporting said containers and mounted on said beam structure at a distance from the fulcrum of the latter and constructed and arranged to permit each of said containers when empty to be moved adjustively and independently of each other relative to said beam structure in a manner to vary the moment exerted by said combined structure assemblage and containers on said load counterbalancing mechanism, thereby to alter the weight registering position of said indicator without corresponding change of load on said receptacle.

4. In a scale, an assemblage of parts for holding an article container upon a tilting beam structure at variable distances from the fulcrum thereof, including in combination with said beam structure, a bar slidably mounted on said beam structure and projecting lengthwise therebeyond in a manner to support the article container at a point substantially farther from the fulcrum of the beam structure than said beam structure extends, and a turnable adjustor element constructed and arranged to cooperate with said structure and bar in a manner to effect small increments of lengthwise movement of said bar relative to said beam structure when said element is adjustively turned.

5. In a scale an assemblage of parts as defined in claim 4 together with a second bar slidably mounted on the said beam structure and arranged and positioned to support a separate container at a point substantially nearer the said fulcrum of said beam structure than is located the said turnable adjustor element, and a second turnable adjustor element constructed and arranged to cooperate with said beam structure and said second bar in a manner to effect small increments of lengthwise movement of the latter relative both to said first bar and to said beam structure when said second element is adjustively turned.

6. In a scale, an assemblage of parts for holding an article container upon a tilting beam structure at variable distances from the fulcrum of the latter, including in combination with said beam structure, an arm carried by said beam structure in offset relation thereto, a bar slidably mounted on said arm and projecting lengthwise therefrom toward the fulcrum of the beam structure in a manner to support the article container at a point substantially nearer to said fulcrum than said arm extends, and a turnable adjustor element constructed and arranged to cooperate with said arm and bar in a manner to effect small increments of lengthwise movement of said bar relative to said arm when said element is adjustively turned.

7. Adjustable supporting structure for counting pans embodying in combination with separate counting pans, separate bars adapted to support said counting pans respectively, a support arm constructed to engage longitudinally spaced adjacent end portions of said bars in a manner to hold two of said bars in lengthwise alignment, and means cooperative between each of said bars and said support arm constructed and arranged to move said bars in a manner to vary adjustively the spacing between said end portions of said bars.

8. Adjustable supporting structure for counting pans as defined in claim 7 in which the said means cooperative between each of the said bars and the said support arm comprises two axially aligned screws whose head ends abut against each other and whose shanks have threaded engagement respectively with said bars.

9. Adjustable supporting structure for counting pans as defined in claim 7 in which the said support arm has two perforated spaced abutments rigid therewith and in which the said means comprises two aligned screws whose head ends abut against each other and are located between said abutments and whose shanks penetrate said abutments and have threaded engagement respectively with said bars.

10. Adjustable supporting structure for counting pans as defined in claim 7 in which the said support arm has a channel affording a seat in which the said bars are slidingly mounted together with two notched abutments occupying said channel and rigid with said support arm, and in which the said means comprises two aligned screws whose head ends abut against each other and are located between said abutments and whose shanks respectively occupy the notches in said abutments and have threaded engagement respectively with said bars.

11. Adjustable supporting structure for counting pans embodying in combination, separate bars having elongated holes therethrough and adapted to support separate counting pans respectively, a support arm constructed to engage spaced adjacent end portions of said bars in a manner to hold two of said bars in lengthwise alignment, means cooperative between each of said bars and said support arm constructed and arranged to move said bars in a manner to vary adjustively the spacing between said end portions of said bars, and fastening screws passing through said elongated holes in said bars to permit said movement of the bars and having threaded engagement with said support arm for clamping said bars against said arm.

12. Adjustable supporting structure for counting pans as defined in claim 11 together with a cover plate overlying the said end portions of both of the said bars and penetrated by the said fastening screws thereby to be clamped against said end portions of both bars.

13. Adjustable supporting structure for counting pans embodying in combination with separate counting pans, separate bars adapted to support said counting pans respectively, a support arm constructed to engage spaced adjacent end portions of said bars in a manner to hold two of said bars in lengthwise alignment, means cooperative between one of said bars and said support arm constructed and arranged to move said one bar in a manner to vary adjustively its position relative both to said support arm and to the other of said bars, and means cooperative between said other bar and said support arm constructed and arranged to move said other bar in a manner to vary adjustively its position relative both to said support arm and to the first said one bar.

14. In a counting scale, the combination of a load receptacle, mechanism constructed and connected automatically to counterbalance a load on said receptacle, a weight indicator connected to be moved by said mechanism, a fulcrum supported tare beam structure connected to impart a moment to said mechanism, at least two separate counting-piece containers, and an assemblage of members supporting said containers and mounted on said beam structure away from said fulcrum of the latter and independently adjustable to maintain each of said containers when empty in positions differently related to the fulcrum of said beam structure so that respectively different moments are exerted by said combined structure and assemblage and containers on said load counterbalancing mechanism, whereby the zero weight registering position of said indicator may be corrected and maintained with no other adjustment of the scale being required for this purpose.

OSWALD S. CARLISS.